United States Patent Office
3,328,342
Patented June 27, 1967

3,328,342
STABILIZATION OF POLYCARBONAMIDES WITH ORGANIC PHOSPHINATES AND MANGANOUS HYPOPHOSPHITE
Albert Louie Reaves, Chattanooga, Tenn., assignor to E. I. du Pont de Nemours and Company, Wilmington, Del., a corporation of Delaware
No Drawing. Filed Sept. 18, 1962, Ser. No. 224,536
9 Claims. (Cl. 260—45.75)

This application is a continuation-in-part of my application Ser. No. 852,175 filed Nov. 12, 1959, now abandoned.

This invention relates to a novel and useful shaped article produced from a synthetic linear polyamide and to a process for its preparation. More particularly, it relates to a stabilized, synthetic polycarbonamide filament and a process for its melt spinning.

Polycarbonamide filaments, which are commercially known as nylon, can be stabilized against the action of heat by carrying out the melt polymerization of the polymer in the presence of a minor amount of a phosphinate compound as a heat stabilizer (Ben Ser. No. 514,390, filed June 9, 1955, now abandoned and Ser. No. 764,733, now U.S. Patent 2,981,715). It is also known that nylons can be stabilized against the action of light by incorporating into the polymer certain other salts (Van Oot U.S. Patent 2,887,462). The addition of salts, however, has in the past always been accompanied by undesirable results in the mechanical properties of the yarn and the commercial process-ability of the yarn. For example, the number of cleaner breaks, the number of draw-twist breaks and the number of draw-roll wraps is significantly higher when known additives are employed in commercial production.

It is an object of the present invention, therefore, to provide a synthetic polycarbonamide filament stabilized against the action of both heat and light without an undesirable drop in yarn properties and commercial processability.

Another object is to provide a process for the production of a stabilized polycarbonamide filament which may be processed in the conventional manner without an undesirable increase in the number of cleaner breaks, draw-twist breaks and draw-roll wraps.

Other objects will become apparent in the course of the following specification and claims.

These objects are accomplished by the present invention which provides a stabilized filament and a process of preparing the stabilized filament of a synthetic linear polycarbonamide which comprises preparing the polymer by melt polymerization in the presence of a dissolved phosphinate compound of the formula

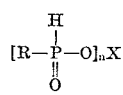

wherein R is a radical selected from the class consisting of alkyl, cycloalkyl, alkenyl, aryl, arylalkyl, and arylalkenyl, which may be substituted with a member of the class consisting of hydroxy, carboxy, carbalkoxy, cyano, amino, and halo;

X is selected from the class consisting of each radical of R, an alkyl substituted ammonium cation, and metal; with the proviso that when X is metal, $n$ is a whole number corresponding to the valence of the metal, and when X is other than metal, $n$ is one;

X and R being alkylene when joined to form a ring structure, incorporating into the polymer from 0.0002 to 0.050% based on the weight of the polymer of manganous hypophosphite, the said dissolved phosphinate compound being employed in the melt polymerization in amounts of from 2 to 7 times the amount of the manganous hypophosphite, and thereafter extruding the molten polymer through an orifice into a quenching medium to form a filament. The stabilized filaments of the present invention are the filaments resulting from the preceding process.

The term "synthetic linear polycarbonamide" is used to signify the conventional "nylon" polymers wherein the carbonamide linkages are an integral part of the main polymer chain. The expression "preparing the polymer by melt polymerization in the presence of a dissolved phosphinate compound" means that the phosphinate compound is present in the mixture of reactants while polymerization takes place. The phosphinate compound may be added to the individual reactants either before or during polymerization providing that they are present in the dissolved state as polymerization proceeds. Similarly, the expression "incorporating into the polymer" is used to mean that the manganous hypophosphite is added to the polymer prior to extrusion. The manganous hypophosphite, however, may be added to the reactants prior to polymerization so that ti is present with the phosphinate compound at this stage or it may be added after polymerization is complete and the polymer is ready for extrusion.

In a preferred embodiment of the present invention, poly(hexamethylene adipamide) is stabilized with from 0.003 to 0.025% of manganous hypophosphite and sodium phenylphosphinate is employed in amounts of from 3 to 6 times the amount of the manganous hypophosphite.

The following examples are cited to illustrate the invention and are not intended to limit it in any manner.

*Example I*

A stainless steel autoclave is purged of air, filled with nitrogen and charged with an aqueous solution containing 75% by weight of hexamethylene diammonium adipate, 0.54 mole percent acetic acid, and 0.12% (based on the polymer weight) of sodium phenyl phosphinate in the form of an aqueous solution containing 25% by weight of the phosphinate. The autoclave is heated until its temperature reaches 195° C. at 250 p.s.i. pressure when 0.02% TiO$_2$ is added. Heating is continued and at 238° C. 0.02% (based on the polymer weight) of manganous hypophosphite in the form of a 10% aqueous solution is added. Heating is continued and at 242° C. bleeding off of water vapor is begun. The polymerization cycle is continued as in Example I of United States Patent 2,163,636. Upon completion of the polymerization reaction, the molten polymer has a relative viscosity of 33.4. The polymer is extruded in the form of a ribbon upon a casting wheel. After quenching, it is cut into chips suitable for remelting at the grid of a spinning assembly. The poly(hexamethylene adipamide) flake is melted in a steam atmosphere as taught in Waltz United States Patent 2,571,975 and is spun into a 70 total denier 34 filament yarn at a rate of 1500 yards per minute. The yarn has good stability against the action of heat and light. The number of draw-twist breaks, draw-roll wraps and cleaner breaks (determined by backwinding the packages and counting the breaks) are measured. The results are recorded in Table I and are compared to Controls I and II prepared following the same techniques, but omitting the manganous hypophosphite and the sodium phenyl phosphinate, respectively. The table clearly shows the unexpected improvement due to the combination of the two additives.

TABLE I

|  | Draw-Twist, Breaks/lb. | Draw-Roll Wraps (Percent) | Cleaner Breaks Per Million End Yards |
|---|---|---|---|
| Yarn prepared as described above | 0.007 | 3.8 | 0.33 |
| Control Yarn I, no manganous hypophosphite | 0.017 | 9.4 |  |
| Control yarn II, no sodium phenylphosphinate | 0.500 | 40.0 | 5.4 |

*Example II*

A semidull yarn, containing 0.3% titanium dioxide is prepared following the procedures of Example I but adjusting the amount of the aqueous slurry of TiO₂ added during the polymerization. Similar reductions in draw-twist breaks, draw-roll wraps, and cleaner breaks, relative to comparative controls, are observed.

*Example III*

A bright yarn, containing 0.02% TiO₂ is prepared following the procedure of Example I but using 0.08% (based on the polymer weight) sodium cyclohexylphosphinate instead of the 0.12% (based on the polymer weight) of sodium phenylphosphinate. The yarn has good stability against the action of heat and light. The number of draw-twist breaks and draw-roll wraps are measured. The results are recorded in Table 2 and are compared to Controls III and IV prepared following the same techniques of this Example III, but omitting the manganous hypophosphite and the sodium cyclohexylphosphinate respectively. This Table 2 clearly shows the unexpected improvement due to the combination of the two additives.

TABLE 2

|  | Draw-Twist, Breaks/lb. | Draw-Roll Wraps (Percent) |
|---|---|---|
| Yarn prepared as described above | 0.007 | 8.2 |
| Control yarn III no manganous hypophosphite | 0.073 | 69 |
| Control yarn IV no sodium cyclohexylphosphinate | 0.5 | 40 |

This Example III specifies the process, and the filaments formed by that process, of this invention, when R in the above-mentioned formula for the dissolved phosphinate compound is a cycloalkyl radical. Other cycloalkyl phosphinate compounds which are also operable in this invention are sodium cyclopentylphosphinate and sodium 2-methyl cyclohexylphosphinate.

*Example IV*

A bright yarn containing 0.02% TiO₂ is prepared following the procedure of Example I, but using 0.08% (based on the polymer weight) sodium isobutyl phosphinate instead of the 0.12% (based on the polymer weight) of sodium phenylphosphinate. Similar results in draw-twist breaks and draw-roll wraps (relative to comparable controls) are observed.

*Example V*

Yarn is prepared following the procedure of Example I except that sodium phenyl phosphinate is employed at a concentration of 0.006% and the manganous hypophosphite at a concentration of 0.003%, both based on the polymer weight. The yarn has good stability against the action of heat and light. Table 3 below shows the unexpected improvement due to the combination of the two additives.

TABLE 3

|  | Draw-Twist, Breaks/lb. | Draw-Roll Wraps (Percent) | Cleaner Breaks Per Million End Yards |
|---|---|---|---|
| Yarn prepared as described above | 0.007 | 6.8 | 0.20 |

Other phosphinate compounds that may be used in the practice of this invention are those set forth in the aforementioned Ben application, Ser. No. 764,733, now U.S. Patent 2,981,715. Among the suitable phosphinates are sodium phenylphosphinate,
hexamethylene diammoniumphenylphosphinate,
sodium 2-hydroxybutyl-2-phosphinate,
sodium 2,5-dimethylphenylphosphinate,
sodium p-methylphenylphosphinate,
sodium ethylphosphinate,
sodium isobutylphosphinate,
sodium 3-pentylphosphinate,
sodium cyclopentylphosphinate,
sodium cyclohexylphosphinate,
sodium 2-methylcyclohexylphosphinate,
sodium isooctenylphosphinate,
sodium isooctylphosphinate,
sodium n-octylphosphinate,
sodium styrylphosphinate,
disodium 1,6-hexyl-diphosphinate,
sodium 3-hydroxypropylphosphinate,
sodium 3-hydroxy-2-methylpropylphosphinate,
potassium 3-hydroxy-2-methylpropylphosphinate,
potassium 2-hydroxybutyl-2-phosphinate,
potassium 1-hydroxy-1-phenethylphosphinate,
sodium α-hydroxydiphenylmethylphosphinate,
sodium α-(n-butylamino)isopropylphosphinate,
sodium α-(2-phenethylamino)isopropylphosphinate,
sodium 1-carboxypropyl-2-phosphinate,
sodium 4-carbomethoxybutylphosphinate,
sodium 4-cyanobutylphosphinate,
disodium 1,8-diaminooctyl-3,6-diphosphinate,
sodium 1,2-dicarboxyethylphosphinate,
sodium 1,4-dicarboxybutyl-2-phosphinate,
sodium 1,4-dicyanobutyl-2-phosphinate,
lithium phenylphosphinate,
potassium phenylphosphinate,
rubidium phenylphosphinate,
cesium phenylphosphinate,
magnesium phenylphosphinate,
calcium phenylphosphinate,
barium phenylphosphinate,
manganous phenylphosphinate,
aluminum phenylphosphinate,
stannous phenylphosphinate,
stannic phenylphosphinate,
potassium p-dodecylphenylphosphinate,
sodium p-dimethylaminophenylphosphinate,
potassium p-dimethylaminophenylphosphinate,
tetramethylammonium phenylphosphinate,
sodium p(β-carboxyethyl)phenylphosphinate,
3-hydroxypropylphosphinic acid phostone,
3-hydroxy-2-methylpropylphosphinic acid phostone,
sodium o-methylphenylphosphinate,
sodium m-methylphenylphosphinate,
sodium o-ethylphenylphosphinate,
sodium m-ethylphenylphosphinate,
sodium 2,3-dimethylphenylphosphinate,
sodium 2,4-dimethylphenylphosphinate,
barium 2,5-dimethylphenylphosphinate,
sodium p-ethylphenylphosphinate,
sodium p-isopropylphenylphosphinate,
sodium p-methoxyphenylphosphinate,
sodium p-bromophenylphosphinate, and
the like.

The combination of the manganous hypophosphite and a phosphinate compound improves the stability of, and is particularly beneficial to, any synthetic linear polycarbonamide wherein the amide linkages are in the main polymer chain. Such polymers, in addition to containing a phosphinate and hypophosphite of this invention, may be modified by the addition of a moderate amount of antistatic and dyeing assistants such as polyvinylpyrrolidone and polyethylene oxide. The phosphinate compound should be added prior to heating the polyamide forming reactants to an elevated temperature near the melting point of the polyamide. It is essential that it be added prior to the melt-spinning operation. Conveniently, it may be added to the salt solution before the beginning of the polymerization reaction.

The manganous hypophosphite may be added during the polymerization or to the molten polymer prior to extrusion. In any event, it is necessary that it be present in the molten polymer as it is extruded if the unexpected processability of the present invention is to be obtained.

This invention particularly applies to linear polyamides whose carbonamide linkages are an integral part of the main polymer chain although some benefit may be obtained when using other synthetic linear fiber-forming nitrogen-containing condensation polymers such as polythioamides, polyureas, polythioureas, polyurethanes, polythiourethanes, and the like.

Typical of such polycarbonamides are those formed from an aliphatic diamine and an aliphatic acid containing the repeating unit

—X—Z—Y—Z— wherein X and Y represent divalent aliphatic, cycloaliphatic, or mixed aliphatic-cycloaliphatic groups, and —Z— represents the

linkage. Especially useful polyamides are those in which —X— and —Y— are $(CH_2)_{n-1}$, where $n$ is a positive integer of from 1 to 12 inclusive. —X— and —Y— may be the same or different except that where $n$ is 1, —X— and —Y— are different. Polyhexamethylene adipamide, polycaproamide (i.e., "66" and "6" nylon) and polyundecanoamide are typical. Useful polyamides are also those in which —X— and/or —Y— is cycloaliphatic or aliphatic-cycloaliphatic, such as those derived from hexahydroterephthalic acid, bis(4-amino cyclohexyl)methane and bis(4-aminocyclohexyl)propane-2.

Other suitable polyamides are those having the repeating structure

—A—Z—X—Z— wherein —A— is a divalent aromatic radical and —X— and —Z— are as previously defined. Polyhexamethylene isophthalamide and poly(dimethyl hexamethylene terephthalamide) are illustrative of such polymers.

Additional polyamides having repeating units such as

—A—Z—B—Z— and

—X—Z—B—Z— where —B— is divalent alkaryl (such as xylylene) may be used provided that only the melt spinnable polymers and copolymers are intended. Poly(m-xylylene adipamide) and poly(p-xylylene sebacamide) are typical.

Another class of suitable polyamides containing other than aromatic intracarbonamide repeating units are those prepared from piperazine, such as those from piperazine and adipic acid and the like, including methyl substituted derivatives of piperazine.

Melt-spinnable copolyamides wherein the amide linkage is the predominant linkage, and mixtures of such polyamides may also be useful.

The stabilized polymeric compositions of this invention may also contain small amounts of such additives as antistatic agents, dyeing and coloring aids, and ultraviolet screens.

Polymers and copolymers stabilized according to this invention are useful for spinning continuous filaments, of round, lobed, and odd-cross section, and either of substantially uniform or of mixed deniers. These stabilized polymeric filaments may comprise core and sheath, side-by-side bicomponent, may be irradiation-grafted and may be of a hollow structure.

These stabilized polymeric filaments may be processed into tow and staple, and also may be bulked, crimped, textured, etc.

It will be apparent that there are other phosphinates which are a part of this invention and are defined by the structural formula given earlier; therefore, the examples are not intended to be limiting in any manner.

The expression "extruding the molten polymer through an orifice into a quenching medium" is employed to mean the conventional melt-spinning process whereby the polymer is melted and forced through a hole or slot into a medium such as a liquid or gas, generally air, or an inert gas, to cool and solidify the polymer into a long, substantially continuous structure. The use of plasticizers and other such means to facilitate extrusion and formation of filaments, particularly from high melting or somewhat unstable polymers is conventional and may be used in conjunction with this invention.

In a preferred embodiment of the present invention, a polymer is used which contains a small amount of a conventional delusterant such as titanium dioxide, barium sulfate, aluminum trioxide, and the like. Such materials and the amounts employed are disclosed in U.S. Patent 2,205,722. At least 0.02%, and as much as about 5% (by weight based on the weight of the polymer) of finely divided titanium dioxide is used for delustering purposes. Preferably, an amount of this delusterant is used within the range of from 0.02% to 2% (by weight based on the weight of the polymer).

Many other equivalent modifications will be apparent to those skilled in the art from a reading of the foregoing without a departure from the inventive concept.

What is claimed is:

1. A process of preparing a stabilized filament of a synthetic linear fiber-forming polycarbonamide having recurring hydrogen-bearing amide groups as an integral part of the main polymer chain which comprises preparing the polymer by melt polymerization in the presence of a dissolved phosphinate compound of the formula

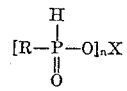

wherein

R is a radical selected from the class consisting of alkyl, cycloalkyl, alkenyl, aryl, arylalkyl, and arylalkenyl, which may be substituted with a member of the class consisting of hydroxy, carboxy, carbalkoxy, cyano, amino, and halo;

X is selected from the class consisting of each radical of R, an alkyl substituted ammonium cation, and metal; with the proviso that when X is metal, $n$ is a whole number corresponding to the valence of the metal, and when X is other than metal, $n$ is one;

X and R being alkylene when joined to form a ring structure, incorporating into the polymer from 0.0002 to 0.050% based on the weight of the polymer of manganous hypophosphite, the said dissolved phosphinate compound being employed in the melt polymerization in amounts of from 2 to 7 times the amount of the manganous hypophosphite, and thereafter extruding the molten polymer through an orifice into a quenching medium to form a filament.

2. The process of claim 1 wherein the manganous hypophosphite is employed in amounts of from 0.003 to 0.025%.

3. The process of claim 1 wherein the phosphinate compound is employed in amounts of from about 3 to 6 times the amount of the manganous hypophosphite.

4. The process of claim 2 wherein the phosphinate compound is employed in amounts of from about 3 to 6 times the amount of the manganous hypophosphite.

5. A process of preparing a stabilized filament of poly(hexamethylene adipamide) which comprises preparing the polymer by melt polymerization in the presence of dissolved sodium phenylphosphinate, incorporating into the polymer from 0.003 to 0.025% based on the weight of the polymer of manganous hypophosphite, the said sodium phenylphosphinate being employed in the melt polymerization in amounts of from 3 to 6 times the amount of the manganous hypophosphite, and thereafter extruding the molten polymer through an orifice into a quenching medium to form a filament.

6. The filament formed by the process of claim 1.

7. The filament formed by the process of claim 5.

8. A process for preparing a stabilized filament of a synthetic linear fiber-forming polycarbonamide having recurring hydrogen-bearing amide groups as an integral part of the main polymer chain which comprises preparing the polymer by melt-polymerization in the presence of dissolved sodium phenylphosphinate, incorporating into the polymer from 0.0002 to 0.050% of manganous hypophosphite based on the weight of the polymer, said dissolved phosphinate compound being employed in the melt polymerization in amounts of from 2 to 7 times the amount of the manganous hypophosphite, and thereafter extruding the molten polymer through an orifice into a quenching medium to form a filament.

9. The filament formed by the process of claim 8.

References Cited

UNITED STATES PATENTS

| 2,887,462 | 5/1959 | Van Oot | 260—37 |
| 2,981,715 | 4/1961 | Ben | 260—78 |
| 3,009,900 | 11/1961 | Hansen | 260—45.75 |
| 3,043,810 | 7/1962 | Diechert et al. | 260—78 |

DONALD E. CZAJA, *Primary Examiner.*

J. R. LIBERMAN, LEON J. BERCOVITZ, T. D. KERWIN, M. J. WELSH, *Assistant Examiners.*